United States Patent [19]

Ryoke et al.

[11] Patent Number: 5,456,734
[45] Date of Patent: Oct. 10, 1995

[54] ABRASIVE MEMBER

[75] Inventors: Katsumi Ryoke; Masami Sato; Masaaki Fujiyama, all of Kanagawa, Japan

[73] Assignee: Fuji Photo Film Co., Ltd., Kanagawa, Japan

[21] Appl. No.: 239,387

[22] Filed: May 6, 1994

[30] Foreign Application Priority Data

May 7, 1993 [JP] Japan ................................. 5-106980

[51] Int. Cl.$^6$ ................................. B24D 3/24; G11B 5/41
[52] U.S. Cl. ........................................ 51/295; 360/128
[58] Field of Search ................................ 51/295; 360/128

[56] References Cited

U.S. PATENT DOCUMENTS

| | | | |
|---|---|---|---|
| 2,581,414 | 1/1952 | Hochberg et al. | 241/22 |
| 2,855,156 | 10/1958 | Hochberg et al. | 241/22 |
| 3,026,215 | 3/1962 | Fukuda et al. | 427/599 |
| 3,031,341 | 4/1962 | Eschenfelder et al. | 428/329 |
| 3,100,194 | 8/1963 | van der Burgt et al. | 252/62.6 |
| 3,242,005 | 3/1966 | Morita et al. | 428/424.4 |
| 3,389,014 | 6/1968 | Akashi et al. | 428/329 |
| 3,574,683 | 4/1971 | Johnston, II | 427/128 |
| 3,574,685 | 4/1971 | Haines | 427/132 |
| 3,667,913 | 6/1972 | Hund | 23/219 |
| 3,978,520 | 8/1976 | Nowicki et al. | 358/10 |
| 4,135,016 | 1/1979 | Ogawa et al. | 428/64 |
| 4,135,032 | 1/1979 | Akaski et al. | 428/828 |
| 4,138,229 | 2/1979 | Tadokoro et al. | 51/398 |
| 4,267,207 | 5/1981 | Sasazawa et al. | 427/129 |
| 4,388,368 | 6/1983 | Hibino et al. | 428/336 |
| 4,411,953 | 10/1983 | Miyoshi et al. | 428/336 |
| 4,490,762 | 12/1984 | Akaski et al. | 360/128 |
| 4,504,542 | 3/1985 | Miyoshi et al. | 428/336 |
| 4,528,240 | 7/1985 | Miyoshi et al. | 428/323 |
| 4,652,958 | 3/1987 | Miyoshi et al. | 360/128 |

FOREIGN PATENT DOCUMENTS

| | | |
|---|---|---|
| 848363 | 8/1970 | Canada. |
| 3338854 | 4/1984 | Germany. |
| 39-10307 | 6/1964 | Japan. |
| 44-14090 | 6/1969 | Japan. |
| 45-18372 | 6/1970 | Japan. |
| 46-28466 | 8/1971 | Japan. |
| 46-38755 | 11/1971 | Japan. |
| 47-4286 | 2/1972 | Japan. |
| 47-12422 | 4/1972 | Japan. |
| 47-17284 | 5/1972 | Japan. |
| 47-18573 | 5/1972 | Japan. |
| 47-18509 | 5/1972 | Japan. |
| 47-22062 | 6/1972 | Japan. |
| 47-22513 | 6/1972 | Japan. |
| 48-29280 | 9/1973 | Japan. |
| 48-39639 | 11/1973 | Japan. |
| 5626890 | 6/1981 | Japan. |
| 57-123532 | 8/1982 | Japan. |
| 58-29605 | 6/1983 | Japan. |
| 59-116926 | 7/1984 | Japan. |
| 59-126605 | 7/1984 | Japan. |
| 59-142741 | 8/1984 | Japan. |
| 59-165239 | 9/1984 | Japan. |
| 60-44254 | 10/1985 | Japan. |
| 61-129731 | 6/1986 | Japan. |
| 62-92205 | 4/1987 | Japan. |
| 62-37451 | 8/1987 | Japan. |
| 63-47069 | 2/1988 | Japan. |
| 422283 | 4/1992 | Japan. |

*Primary Examiner*—Deborah Jones
*Attorney, Agent, or Firm*—Sughrue, Mion, Zinn, Macpeak & Seas

[57] ABSTRACT

An abrasive tape for polishing a magnetic head includes a substrate and an abrasive layer which is formed on the substrate. The abrasive layer is composed of abrasive grains and a binder having an acidic functional group. The abrasive layer contains basic carbon black having a pH within the range of 7 to 10 and a mean grain size of 0.01 to 0.1 μm.

3 Claims, No Drawings

ABRASIVE MEMBER

BACKGROUND OF THE INVENTION

1. Field of the Invention

This invention relates to an abrasive member useful, for instance, as an abrasive tape or a cleaning tape to be used for polishing or cleaning of a magnetic head for a magnetic recording and reproducing apparatus or to be used for polishing, burnishing, texturing, or cleaning of various materials, particularly magnetic recording media. This invention particularly relates to an abrasive material particularly useful for an abrasive tape to be used for rough polishing, finish polishing of a magnetic head for video tape recorders or audio decks and a cleaning tape to be used for cleaning of such magnetic head.

2. Description of the Prior Art

Video or audio magnetic heads are required to have very smooth tape sliding surfaces and to be free of any foreign substance, such as dust. Therefore, in general, during the process for making the magnetic head, the magnetic head is located at a predetermined position after being roughly polished, and two reels are located with the magnetic head intervening therebetween. In this state, an abrasive tape is moved between the two reels in order to polish the tape sliding surface of the magnetic head. Also, an abrasive tape is incorporated in a cassette and moved therein in order to remove any foreign substance from the tape sliding surface of the magnetic head. In general, the abrasive tape comprises a nonmagnetic substrate and an abrasive layer, which is overlaid on the substrate and primarily comprises fine abrasive grains and a binder or fine abrasive grains, ferromagnetic fine powder and a binder. Since the abrasive tape is flexible, it can snugly fit to and move along the curved surface of the tape sliding surface of the magnetic head and accordingly is capable of accurately polishing and smoothing the tape sliding surface of the magnetic head and reliably removing any foreign substance from the tape sliding surface of the magnetic head.

As disclosed, for instance, in Japanese Unexamined Patent Publication Nos. 62(1987)-92205 and 63(1988)-47069 and Japanese Patent Publication No. 4(1992)-22283, it has been known to add various lubricants such as silicone oil to the abrasive layer in order to improve fitness of the abrasive tape to the magnetic head and lubricity therebetween.

With the progress of high-density recording, various magnetic heads, such as thin-film heads, amorphous heads, laminated heads, MIG heads, and MR heads, have been proposed and have widely been used. It has been difficult to polish a magnetic head having a small width to a desired shape and to a smooth finish without changing the properties, and to remove foreign substances from a magnetic head without decreasing the effective depth.

SUMMARY OF THE INVENTION

In view of the foregoing observations and description, the primary object of the present invention is to provide an abrasive member useful, for instance as an abrasive tape which is capable of polishing the surface of a magnetic head having a small width such as a thin-film head, an amorphous head, a laminated head, a MIG head, and a MR head for high-density recording, to a desired shape and to a smooth finish without changing the properties of the surface of the magnetic head and at the same time is capable of removing foreign substances from the magnetic head without decreasing the effective depth.

The abrasive member in accordance with the present invention comprises a substrate and an abrasive layer which is formed on the substrate and is composed of abrasive grains and a binder having an acidic functional group and is characterized in that the abrasive layer contains basic carbon black.

Preferably the carbon black has a pH within the range of 7 to 10 and a mean grain size of 0.01 to 0.1 μm.

Since the binder in the abrasive layer has an acidic functional group, the basic functional group on the surface of the basic carbon black bonds to the acidic functional group to promote dispersion of the carbon black, whereby a smooth abrasive layer film can be easily obtained, grain dropping can be prevented and the friction coefficient of the abrasive layer can be reduced.

In the abrasive member of the present invention, the carbon black in the abrasive layer lowers Rs to suppress electrostatic trouble between the abrasive member and the magnetic head or the roller with which the abrasive member is brought into contact and gives a proper flexibility to the abrasive layer so that the abrasive layer is less apt to be scratched by the magnetic head. Further since the carbon black is basic, the carbon black can be easily kneaded with the binder and can be easily dispersed in the binder uniformly, which is considered to result in a network-like abrasive grain supporting structure to prevent the carbon black and the abrasive grains from dropping off.

When the mean grain size of the carbon black is in the range of 0.01 to 0.1 μm, the carbon black can be uniformly incorporated in the fine abrasive grains and the frictional resistance and the surface resistance can be sufficiently lowered.

As can be understood from the description above, the carbon black in the abrasive layer of the abrasive member of the present invention suppresses formation of strain layer in the polished video head and makes more smooth the surface of the polished head, thereby increasing the output power of the head. Especially when the carbon black has a pH within the range of 7 to 10 and a mean grain size of 0.01 to 0.1 μm, the carbon black is better mixed with the binder and the abrasive grains and is better dispersed therein. Further when the amount of the carbon black relative to the amount of the abrasive grains is proper, the surface resistance is lowered and dispersion of the carbon black is greatly improved.

The binder employed in the abrasive member of the present invention has an acidic functional group as described above. As the acidic functional group, —COOM. —SO$_3$M, PO(OM)$_2$, —OSO$_3$M, —SO$_2$M (wherein M represents H, an alkali metal or an alkaline earth metal) can be used. Among them, —SO$_3$M, a phosphoric acid salt and a carboxylic acid group are especially preferred in that they have a high degree of acidity and are strongly adsorbed on the surface of carbon black.

The acidic functional group should preferably be contained in a proportion within the range of $1\times10^{-6}$ equivalent to $1\times10^{-2}$ equivalent per gram of the binder, and more preferably in a proportion within the range of $1\times10^{-5}$ equivalent to $1\times10^{-3}$ equivalent per gram of the binder. When the content of the acidic functional group is too small, the carbon black grains can drop off and the degree of dispersion cannot be improved. When the content of the acidic functional group is too large, the binder agglomerates and the degree of dispersion lowers.

The proportion of the binder having an acidic functional group should be within the range of 10 to 50% by weight of the total of the binder in the abrasive layer, and preferably should be within the range of 15 to 40% by weight of the total of the binder in the abrasive layer.

The carbon black preferably has a pH within the range of 7 to 10 and more preferably has a pH within the range of 7.5 to 9.5. When the carbon black is acidic, dispersion of the carbon black is not sufficiently promoted and the surface of the abrasive layer becomes rough.

The carbon black content of the abrasive layer should preferably be within the range of 2 to 10% by weight of the abrasive grains and more preferably within the range of 3 to 8% by weight of the abrasive grains. When the carbon black content is too large, agglomeration occurs and the surface of the abrasive layer roughens, which can results in scratch in the polished magnetic head. On the other hand, when the carbon black content is too small, dispersion of the carbon black becomes poor and also the surface of the abrasive layer also roughens, which can results in scratch in the polished magnetic head.

In the case where the abrasive member of the present invention is in the form of an abrasive tape, a back coating layer comprising carbon and a binder may be provided on a flexible substrate on which the abrasive layer is formed in order to reduce the friction coefficient in the running system of the abrasive tape.

Preferably the amount of the binder per 100 parts by weight of inorganic grains in the abrasive layer of the abrasive tape including the abrasive grains should be within the range of 5 to 70 parts by weight and the thickness of the substrate should be not larger than 50 μm in order to polish the magnetic head to a desired shape and to a smooth finish and to remove any foreign substance from the magnetic head without the effective depth being decreased markedly.

The abrasive grains which are contained in the abrasive layer (and which may also be contained in the backing layer) of the abrasive tape should preferably be selected from the materials, which generally have the polishing effects or scratch polishing effects and which are utilized in order to polish magnetic heads efficiently and in order to enhance the effects of cleaning the magnetic heads of video tape recorders. Preferred examples of the abrasive grains which can be employed in the abrasive member in accordance with the present invention, include chromium oxide grains, α-alumina grains, silicon carbide grains, non-magnetic iron oxide grains, diamond grains, γ-alumina grains, α,γ-alumina grains, fused alumina grains, cerium oxide grains, corundum grains, artificial diamond grains, garnet grains, emery (major constituents: corundum and magnetite) grains, silica grains, silicon nitride grains, boron nitride grains, molybdenum carbide grains, boron carbide grains, tungsten carbide grains, titanium carbide grains, tripoli grains, diatomaceous earth grains, and dolomite grain which have a mean grain diameter within the range of 0.005 μm to 20 μm. The abrasive grains should preferably have a Mohs hardness of not less than 6. One of the above-enumerated abrasive grain materials may be used alone, or two to four materials may be used in combination. In cases where the abrasive grains are used in the back coating layer, their proportions should preferably fall within the range of 0.01 to 5 parts by weight with respect to 100 parts by weight of a resin, which will be described later. Examples of the fine abrasive grains, which may be contained in the backing layer, include alumina grains AKP1, AKP15, AKP20, AKP30, AKP50, AKP80, Hit50, and Hit100, which are supplied by Sumitomo Chemical Co., Ltd., and chromium oxide grains G5, S3, and S1, which are supplied by Nippon Chemical Industrial Co., Ltd.

The abrasive layer of the abrasive member in accordance with the present invention may also contain magnetic fine grains in proportions of not larger than 40% by weight with respect to the amount of the abrasive grains. As the magnetic grains, any of known ferromagnetic fine grains may be employed. Examples of the ferromagnetic fine grains include γ-$Fe_2O_3$, Co-containing (Co-adhered, Co-modified, or Co-doped) γ-$Fe_2O_3$, $Fe_3O_4$, Co-containing (Co-adhered, Co-modified, or Co-doped) $Fe_3O_4$, γ-$FeO_x$, Co-containing (Co-adhered, Co-modified, or Co-doped) γ-$FeO_x$ (wherein x=1.33 to 1.50), $CrO_2$, an Fe—Co alloy, a Co—Ni—P alloy, a Co—Ni—Fe—B alloy, an Fe—Ni—Zn alloy, a Ni—Co alloy, and a Co—Ni—Fe alloy. See, for instance, Japanese Patent Publication Nos. 44(1969)-14090, 45(1470)-18372, 47(1972)-22062, 47(1972)-22513, 46(1971)-28466, 46(1971)-38755, 47(1972)-4286, 47(1972)-12422, 47(1972)-17284, 47(1972)-18509, 47(1972)-18573, 39(1964)-10307, 48(1973)-29280, 48(1973)-39639, 58(1983)-29605 and 60(1985)-44254, Japanese Unexamined Patent Publication No. 59(1984)-126605, U.S. Pat. Nos. 3,026,215, 3,031,341, 3,100,194, 3,242,005 and 3,389,014. The magnetic fine grains may have a size such that the length may fall within the range of approximately 0.005 micrometer to approximately 1 micrometer, and the aspect ratio may take a value between approximately 1/1 and approximately 50/1. The specific surface area of the magnetic grains may fall within the range of 20 $m^2$/g to 80 $m^2$/g and preferably within the range of 20 $m^2$/g to 70 $m^2$/g. The magnetic fine grains may have a coercive force (Hc) within the range of 250 to 2500 $_x$79 A/m, a water content within the range of 0.1 to 2.0% by weight, and a pH within the range of 3 to 11 (5g magnetic grains/100 g water). The ferromagnetic grains may be impregnated with lubricating agents, dispersing agents, antistatic agents, surface treatment agents and the like (to be described later) in solvent so that such agents are adsorbed on the surface of the magnetic fine grains prior to dispersion. The abrasive layer may contain other elements such as Sr, Pb, Mn, Cd, Al, Si, Na, Ca, K, Ti, Cu, Zn, S and the like in an mount not larger than 10000 ppm in order to improve the magnetic properties or as impurities. Particularly metal ferromagnetic fine grains may contain Al or Si compounds as an anti-sintering agent on the surface of the grains in an amount of 1 to 10% by weight.

As the ferromagnetic fine grains, it is also possible to use platy hexagonal barium ferrite, modified barium ferrite, and modified strontium ferrite. The barium ferrite has a diameter of about 0.001 μm to 1 μm and a thickness of ½ to ¹/₂₀ of the diameter. The barium ferrite has a density of 4 to 6 g/cc and a specific surface area of 10 to 70 $m^2$/g. The barium ferrite may contain rare earth elements in an amount of not larger than 10 wt % if necessary. Further the barium ferrite may contain alkaline metals and/or alkaline earth metals in order to improve the magnetic properties or as impurities. Such ferromagnetic fine grains may be impregnated with lubricating agents, dispersing agents, antistatic agents, surface treatment agents and the like (to be described later) in solvent so that such agents are adsorbed on the surface of the magnetic fine grains prior to dispersion.

Examples of the carbon black used in the back coating layer in the abrasive member of the present invention include furnace black for rubber, thermal black for rubber, coloring black, and acetylene black. The carbon black is used as a light blocking agent, a friction coefficient regulating agent, and a durability improving agent. Abbreviations for carbon blacks in the United States which can be employed in the back coating layer in the abrasive member of the present invention are as follows. SAF, ISAF, IISAF, T, HAF, SPF, FF, FEF, HMF, GPF, APF, SRF, MPF, ECF, SCF, CF, FT, MT, HCC, HCF, MCF, LFF, RCF and the like. Carbon blacks which fall within D-1765-82a of United States ASTM standard can be used. The carbon black has a mean grain diameter within the range of 5 to 1,000 millimicrons (as measured with an electron microscope), a specific surface area within the range of 1 $m^2/g$ to 800 $m^2/g$ (as measured with the nitrogen adsorption method), a pH value within the range of 4 to 11 (as measured with the JIS K-6221-1982 method), and a dibutyl phthalate (DBP) oil absorption within the range of 10 ml/100 g to 800 ml/100 g (as measured with the JIS K-6221-1982 method). In the present invention, in cases where the carbon black is utilized in order to decrease the surface electrical resistance of the coating film, the carbon black having a size within the range of 5 to 100 millimicrons is employed. Also, in cases where the carbon black is utilized in order to control the strength of the coating film, the carbon black having a size within the range of 50 to 1,000 millimicrons is employed. For smoothening for the purpose of reducing spacing loss, carbon black having a smaller grain size (smaller than 100 millimicrons) is used and for surface roughening for the purpose of reducing the friction coefficient, carbon black having a larger grain size (not smaller than 100 millimicrons) is used. The kind of the carbon black and the amount of the carbon black added are selected in accordance with the characteristics which the abrasive member is required to have. The carbon black may be subjected to surface treatment with a dispersing agent, which will be described later, or may be grafted with a resin. Carbon black part of the surface of which is graphited by raising the temperature of the oven while the carbon black is manufactured can also be used. As a special carbon black, hollow carbon black can also be used. In cases where the carbon black is employed in the abrasive layer, it should preferably be added in proportions within the range of 0.1 to 100 parts by weight per 100 parts by weight of the inorganic grains. In cases where the carbon black is employed in the back coating layer, it should preferably be added in proportions within the range of 20 to 400 parts by weight per 100 parts by weight of a resin which will be described later. The carbon black which can be employed in the present invention can be selected with reference to, for instance, "Carbon Black Handbook", edited by "Carbon Black Association", 1971.

As the binder which can be used in the abrasive layer and the back coating layer of the abrasive member in accordance with the present invention, any of binder resins known in the art may be used. These binder resins include thermoplastic resins, thermosetting resins, reactive resins, electron beam-curing resins, ultraviolet-curing resins, visible light-curing resins, and mixtures of two or more of these resins.

The thermoplastic resins, which may be used as the binder resin, generally have a softening point of 150° C. or lower, an average molecular weight within the range of approximately 10,000 to approximately 300,000, and a polymerization degree within the range of approximately 50 to approximately 2,000. The polymerization degrees of the thermoplastic resins should preferably fall within the range of approximately 200 to approximately 700. Specifically, as the thermoplastic resin, it is possible to use, for example, a vinyl chloride-vinyl acetate copolymer, a vinyl chloride copolymer, a vinyl chloride-vinyl acetate-vinyl alcohol copolymer, a vinyl chloride-vinyl alcohol copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a synthetic rubber type thermoplastic resin, or a mixture of two or more of these compounds.

The thermosetting resins or the reactive resins, which may be used as the binder resin in the abrasive layer generally have a molecular weight of 200,000 or less when the resins takes on the form of coating compositions. When the coating compositions are heated and humidified after being applied onto substrates and dried, the resins exhibit an infinite increase in the molecular weight through the condensation reactions, the addition reactions, or the like. It is preferable that the resins of these types do not soften or melt before they decompose thermally. Specifically, the thermosetting resins or the reactive resins include, for example, a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

In general, the thermoplastic resins, the thermosetting resins, and the reactive resins described above respectively have their major functional groups as well as one to six kinds of other functional groups. Each of the other functional groups should preferably be contained in proportions within the range of $1 \times 10^{31\ 6}$ equivalent to $1 \times 10^{-2}$ equivalent per gram of the resin. Examples of the other functional groups are acid groups, such as a carboxylic acid group (COOM), a sulfinic acid group, a sulfenic acid group, a sulfonic acid group ($SO_3M$), a phosphoric acid group (PO(OM)(OM)), a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, a sulfobetaine form group, a phosphobetaine form group, and an alkyl betaine form group; an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

Each of the binders described above may be used either alone or in the form of a mixture with one or more of the other binders and is added with additives. The amount of the binder per 100 parts by weight of abrasive grains and/or the ferromagentic fine grains in the abrasive layer should be within the range of 5 to 70 parts by weight. The amount of the binder per 100 parts by weight of the fine grains in the back coating layer should be within the range of 8 to 400 parts by weight. As the additives, dispersing agents, lubricating agents, antistatic agents, antioxidants, mildew-proofing agents, coloring agents, solvents and the like are added.

In the abrasive layer and/or the back coating layer, polyisocyanates may be contained as hardeners. As the polyisocyanates, it is possible to use, for example, isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups. The polyisocyanates enumerated above should preferably have an average molecular weight falling within the range of 100 to 20,000. Such polyisocyanates are commercially available as Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone or as a mixture of two or more thereof different in curing reaction properties. In order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably polyfunctional. The proportions of the polyisocyanate used in each of the abrasive layer and the back coating layer should preferably fall within the range of 2 to 70 parts by weight per 100 parts by weight of the total of the binder resin and the polyisocyanate, and should more preferably fall within the range of 5 to 50 parts by weight per 100 parts by weight of the total of the binder resin and the polyisocyanate.

Examples of the lubricating agents, which may be employed in the abrasive layer and the back coating layer, include fine grains of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine grains of resins, such as an acryl-styrene resin, a benzoguanamine resin, a melamine resin, a polyolefin resin, a polyester resin, a polyamide resin, a polyimide resin, and a polyfluoroethylene resin.

As the lubricating agents, various organic compounds may also be employed. Examples of such organic compounds include compounds into which fluorine or silicon is introduced, such as a silicone oil (e.g., a dialkyl polysiloxane, a dialkoxy polysiloxane, a phenyl polysiloxane, or a fluoroalkyl polysiloxane), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazine, benzodiazole, and EDTA; a fatty acid ester of a monobasic fatty acid having 10 to 40 carbon atoms with at least one or more of a monohydric alcohol, a dihydric alcohol, a trihydric alcohol, a tetrahydric alcohol and a hexahydric alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol falls within the range of 11 to 70; and fatty acids, fatty acid amides, fatty acid alkyl amides, and aliphatic alcohols having 8 to 40 carbon atoms.

Such an organic compound lubricating agent may, for example, be butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, or carnauba wax. Each of these organic compound lubricating agents may be used alone or in combination with one or more of the others.

The abrasive layer may further contain antioxidants (e.g., metal chelating agents, such as an alkyl phenol, benzotriazine, tetraazaindene, sulfamide, guanidine, nucleic acid, pyridine, amine, hydroquinone, and EDTA), rust preventives (e.g., naphthenic acid, alkenylsuccinic acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and foaming preventives. These additives are added in proportions falling within the range of 0.01 to 30 parts by weight per 100 parts by weight of the binder.

These additives are described, for instance, in "IBM Technical Disclosure Bulletin", Vol. 9. NO.0.7, p779, Dec. 1966; "ELEKTRONIC", No.12, p380, 1961; and "Chemical Handbook, Application", pp 954 to 967, 1980 published from MARUZEN.

As the dispersing agents and dispersion assisting auxiliaries, it is possible to employ fatty acids having 2 to 40 carbon atoms ($R_1COOH$, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; metallic soaps (e.g., copper oleate) obtained from the above-enumerated fatty acids and alkali metals (Li, Na, K, and the like), alkaline earth metals (Mg, Ca, Ba, and the like), Cu, or Pb; fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the ferromagnetic fine grains and/or the non-magnetic fine grains or may be added during the dispersion process.

Examples of the mildew-proofing agents, which may be employed in the abrasive member in accordance with the present invention, include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetic acid, mercury phenyloleate, bis(tributyltin) oxide, and salicylanilide. The funksides are described in "Microbial Disasters and Technology of Inhibiting the same" from "Kougaku Tosho", 1972, "Chemistry and Industry" 32, 904 (1979), and the like.

Examples of the antistatic agents other than carbon black, which may be employed in the abrasive member in accordance with the present invention, include conductive grains, such as graphite grains, modified graphite grains, carbon black graft polymer grains, tin oxide-antimony oxide grains, tin oxide grains, and titanium oxide-tin oxide-antimony oxide grains; natural surface active agents, such as saponin; nonionic surface active agents, such as an alkyleneoxide compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound. A part of the surface active agents are also described in "Synthesis of Surface Active Agents and Application of the same" from Maki Shoten, 1972; "Surface Active Agents" from Interscience Publication Corporated, 1985; "Encyclopedia of Surface Active Agents" Vol. 2 from Chemical Publish Company, 1964; "Surface Active Agent Handbook" sixth edition from Sangyou Tosho Kabusikigaisha, Dec. 20, 1966; "Antistatic Agents" from Saiwai Shobou, 1968; and the like. Each of such surface active agents may be added alone or in a mixture of one or more of the others. In cases where the surface active agent is employed in the abrasive layer, it may be added in proportions within the range of 0.01 to 10 parts by weight per 100 parts by weight of the abrasive grains and/or the ferromagnetic fine grains. In cases where the surface active agent is employed in the back coating layer, it may be added in proportions within the range of 0.01 to 30 parts by weight per 100 parts by weight of the binder. The surface active agents may also be used for purposes other than as the antistatic agents, for example, for dispersion, for improvement of magnetic characteristics, for improvement of lubricating properties, as coating assisting auxiliaries, as wetting agents, as hardening accelerators, and as dispersion accelerators.

In the present invention, organic solvents may be used in any proportion during the dispersing, kneading, and coating processes for the coating composition which is used to form the abrasive layer or the back coating layer. Examples of such organic solvents include ketones, such as acetone, methyl ethyl ketone, methyl isobutyl ketone, cyclohexanone, isophorone, and tetrahydrofuran; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. Ordinarily, two or more of the above-enumerated organic solvents are used in combination in arbitrary proportions. The organic solvents may contain small amounts of impurities (e.g., polymerization products of the organic solvents, moisture, and raw material constituents of the organic solvents) in proportions of not larger than 1% by weight. Ordinarily, the organic solvents are used in proportions within the range of 100 to 20,000 parts by weight per 100 parts by weight of the total solids of the coating composition for the abrasive layer, or the coating composition for the back coating layer, or the prime-coating composition. The solid contents of the coating composition should preferably fall within the range of 1% by weight to 40% by weight. The solid contents of the coating composition for the back coating layer should preferably fall within the range of 1% by weight to 20% by weight. An aqueous solvent (e.g., water, alcohols, acetones) may be employed in lieu of the organic solvents.

When the abrasive layer is to be formed, the constituents described above are selected appropriately and dispersed or dissolved in the organic solvents, and a coating composition is thereby prepared. The coating composition is applied onto the flexible substrate and dried. If necessary, the coating composition is subjected to an orientation process. When the abrasive member is in the form of an abrasive tape, the substrate is preferably 2.5 to 500 micrometers in thickness and more preferably 3 to 50 microns in thickness. Further it is preferred that the Young's modulus of the flexible substrate in either one of the longitudinal direction and the transverse direction be not lower than 400 kg/mm$^2$. Examples of the materials for the flexible substrate include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, a polysulfone, a polyphenylsulfone, and a polybenzoxazole; metals, such as aluminum and copper; and ceramic materials, such as glass. Among the above-enumerated materials, the polyethylene naphthalate and the polyamide are preferable. Before the coating composition is applied onto the flexible substrate, the flexible substrate may be subjected to corona discharge treatment, plasma treatment, prime-coating treatment, heat treatment, dust-resistant treatment, metal vapor evaporation treatment, and/or alkali treatment.

No limitation is imposed on how the dispersion and kneading processes are carried out. The order, in which the constituents (the resins, the grains, the lubricants, the solvents, and the like) are added, the timing, with which the constituents are added during the dispersion and kneading processes, the temperature at which the dispersion process is carried out (and which will ordinarily fall within the range of 0° C. to 80° C.), and the like, may be selected appropriately. One of various types of kneading machines may be used in order to prepare the coating composition for the abrasive layer and the coating composition for the back coating layer. For example, it is possible to use a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine. The dispersion and kneading is described in detail, for instance, in "Paint Flow and Pigment Dispersion" by T. C. Patton published from John Wiley & Sons, 1964, "Industrial Material" Vol. 25, 37, 1977, by Shinichi Tanaka and the literature cited therein. In order to efficiently carry out the dispersion and kneading, ancillary materials such as steel balls, steel beads, ceramic beads, glass beads, organic polymer beads and the like having a sphere-equivalent diameter of 10 $cm_\phi$ to 0.05 $mm_\phi$ can be used, though they need not be spherical. The dispersion and kneading is described also in U.S. Pat. Nos. 2,581,414, 2,855,156 and the like. In this invention, the coating compositions for the abrasive layer and the back coating layer can be prepared according to the methods shown in the books, the literature cited in the books, and the patent publications.

When the coating composition for the abrasive layer and the coating composition for the back coating layer are to be applied onto the flexible substrate, the viscosity of each coating composition may be adjusted at a value falling within the range of 1 to 20,000 centistrokes at 25° C. Each coating composition may be applied onto the flexible substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater. See, for example, "Coating Engineering" pp. 253 to 277, Mar. 20, 1971, Asakura Shoten. The coating compositions may be applied in any order. A prime coating layer may be applied to the substrate before application of the respective coating compositions, and the substrate may be subjected to corona discharge treatment before application of the respective coating compositions in order to enhance bonding force of the coating to the substrate. When the abrasive layer and/or back coating layer is to be formed of a plurality of layers, the layers may be applied to the substrate at one time or in sequence. See, for instance, Japanese Patent Publication No. 62(1987)-37451 and Japanese Unexamined Patent Publication Nos. 57(1982)-123532, 59(1984)-142741 and 59(1984)-165239.

The coating composition applied to the substrate in a thickness of about 1 to 100 μm in the manner described above is immediately subjected to multistage drying treatment at 20° to 130° C. while the magnetic grains in the abrasive layer being subjected to magnetic field orientation treatment at 500 to 5000 Gauss, if necessary. The abrasive layer thus formed is dried into a thickness of 0.1 to 10 μm. Normally the substrate is transferred at a speed of 10 to 900 m/min and the drying temperature in the respective drying zones is controlled to 20° to 130° C. so that the amount of residual solvent in the applied film becomes 0.1 to 40 $mg/m^2$. If necessary, the back coating layer is formed in the similar manner. Thereafter the layers are subjected to surface smoothing treatment to a centerline mean surface roughness of 0.001 to 0.3 microns (cut-off 0.25 mm) and then the web is cut into a desired shape. It is preferred that the pretreatment and the surface treatment of the grains, the kneading and dispersion, the application, orientation and drying, smoothing, heat treatment, EB treatment, surface cleaning, cutting and takeup be carried out continuously.

In cases of forming an abrasive, the abrasive tape web, which has been prepared in the manner described above, is cut into abrasive tapes, and each abrasive tape is wound around a desired plastic or metal reel. Before or immediately before the abrasive tape is wound around the reel, the abrasive tape (specifically, the abrasive layer surface, the back coating layer surface, the edge surfaces, and/or the base surface on the back side) should preferably be burnished and/or cleaned. The burnishing process is carried out in order to adjust the surface roughness and the polishing performance of the abrasive tape. Specifically, protrusions on the surface of the abrasive tape are scraped out, and the surface of the abrasive tape is thereby made uniform or smooth by using a hard material, such as a sapphire blade, a shaving blade, a super-hard material blade, a diamond blade, or a ceramic blade. No limitation is imposed on the hardness of the material used for the burnishing process, and any of materials, which can remove protrusions on the surface of the abrasive tape, may be employed. However, the Mohs hardness of the material used for the burnishing process should preferably be 8 or higher. The materials need not necessarily take on the form of blades and may have other shapes, such as square, round, and wheel shapes. (The material may be provided on the circumferential surface of a rotatable cylinder.) The cleaning process is carried out in order to remove foreign substances, excessive lubricating agents, and the like, from the surface of the abrasive tape. For this purpose, the abrasive layer surface, the back coating layer surface, the edge surfaces, and the base surface on the back side are wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), a nylon unwoven fabric, a polyester unwoven fabric, a rayon unwoven fabric, an acrylonitrile unwoven fabric, a mixed unwoven fabric, and tissue paper.

As for the fine abrasive grains, the magnetic grains, the non-magnetic grains, the binders, the additives (such as lubricating agents, dispersing agents, antistatic agents, surface treatment agents, carbon black, light blocking agents, antioxidants, and mildew-proofing agents), the solvents, and/or substrates (which may be provided with a prime-coating layer, a back coating layer, and a back prime-coating layer), which may be utilized for the abrasive member in accordance with the present invention, and how to prepare these constituents, reference may be made to, for example, the method for making a magnetic recording medium, which is disclosed in Japanese Patent Publication No. 56(1981)-26890.

The present invention will further be illustrated by the following non-limitative examples. In these examples, the term "parts" means parts by weight.

heads. (mean values; n=5) The electric resistance of the surface layer of each of the sample abrasive tapes Rs ($\Omega$/SQ) was measured by use of TR8611A manufactured by Takeda Riken.

TABLE 1

|  | carbon black | pH | size (nm) | parts | output (dB) | scratches | Rs ($\Omega$) |
|---|---|---|---|---|---|---|---|
| control 1 |  |  |  | 0 | 0 | 5 | $1 \times 10^{13}$ |
| control 2 | conductex SC | 9.0 | 20 | 1 | 0.2 | 3 | $1 \times 10^{12}$ |
| ex. 1 | conductex SC | 9.0 | 20 | 2 | 1.5 | 0 | $1 \times 10^{9}$ |
| ex. 2 | conductex SC | 9.0 | 20 | 4 | 2.0 | 0 | $1 \times 10^{7}$ |
| ex. 3 | conductex SC | 9.0 | 20 | 6 | 2.3 | 0 | $1 \times 10^{5}$ |
| ex. 4 | conductex SC | 9.0 | 20 | 8 | 2.0 | 0 | $5 \times 10^{4}$ |
| control 3 | conductex SC | 9.0 | 20 | 12 | 1.2 | 1 | $5 \times 10^{4}$ |

Examples 1 through 4 and Controls 1, 2, 3

A prime-coating layer constituted of a polyester polyurethane resin was applied to a thickness of 0.1 µm onto a plurality of polyethylene terephthalate substrates 30 µm thick. Abrasive coating compositions were prepared from the constituents described below wherein carbon black was added in different amounts as shown in table 1. The abrasive coating compositions were applied with a bar coating process onto the prime-coating layer such that the dry thickness of the abrasive layer might be 10 µm. In this manner, various samples of abrasive tapes were prepared. Abrasive coating composition:

| Abrasive grains (SiC) | 95 parts |
|---|---|
| (granular, mean grain diameter: 2.0 µm, Mohs hardness: 9) | |
| Abrasive grains (diamond) | 5 parts |
| (granular, mean grain diameter: 1.0 µm, Mohs hardness: 10) | |
| Binder (polyvinyl chloride-acetate resin, 400X) | 3 parts |
| Binder (polyamide resin) | 4 parts |
| Binder (polyurethane resin) | 4 parts |
| (epoxy group: $1 \times 10^{-5}$ equivalent per g of the resin, containing sodium sulfonate in a proportion of $2 \times 10^{-3}$ equivalent per g of the resin, Mw: 70,000) | |
| Binder (polyisocyanate) | 2 parts |
| (a reaction product of 3 mols of tolylene diisocyanate with 1 mol of trimethylolpropane) | |
| Dispersing agent (copper oleate/phthalocyanine = 1/1) | 0.1 part |
| Lubricating agent (oleic acid/oleic acid oleyl) | 0.1 part |
| Diluting agent | 200 parts |
| (methyl ethyl ketone/cyclohexanone = 2/1) | |
| Diluting agent (toluene/MIBK) | 150 parts |
| Additive (carbon black) | parts shown in Table 1 |

Thereafter, magnetic heads for S-VHS video tape recorders were polished by using each of the prepared abrasive tapes. Each of the polished magnetic head was set in a video tape recorder and the output power was investigated by using a S-VHS tape supplied by Fuji Photo Film Co., Ltd. The results shown in Table 1 were obtained.

As the output power, the reproduction output power at a 4 MHz single frequency was measured. Scratches on the heads were evaluated by visual inspection of the polished heads. (mean values; n=5) The electric resistance of the surface layer of each of the sample abrasive tapes Rs ($\Omega$/SQ) was measured by use of TR8611A manufactured by Takeda Riken.

As can be understood from table 1, the abrasive layers containing therein carbon are effective. When the carbon content was not smaller than 2% of the abrasive grains, scratches on the head which were considered to be due to dust were reduced. When the carbon content was 12% of the abrasive grains, the output of the head was lowered and a scratch was formed on the head, which was considered because the abrasive layer was softened due to addition of the carbon.

Examples 5 and 6 and Controls 4 to 6

A prime-coating layer constituted of a polyester polyurethane resin was applied to a thickness of 0.1 µm onto a plurality of polyethylene terephthalate substrates 25 µm thick. Abrasive coating compositions were prepared from the constituents described below wherein carbon black was added in different amounts as shown in table 2. The abrasive coating compositions were applied with a bar coating process onto the prime-coating layer such that the dry thickness of the abrasive layer might be 25 µm. In this manner, various samples of abrasive tapes were prepared. Abrasive coating composition:

| Abrasive grains (α-alumina) | 100 parts |
|---|---|
| (granular, mean grain diameter: 1 µm, Mohs hardness: 9) | |
| Binder (polyvinyl chloride-acetate resin, MR110, Nihon Zeon) | 6 parts |
| (epoxy group: $1 \times 10^{-5}$ equivalent per g of the resin) | |
| Binder (polyurethane resin) | 4 parts |
| (containing sodium sulfonate in a proportion of $2 \times 10^{-3}$ equivalent per g of the resin, Mw: 70,000) | |
| Binder (polyisocyanate) | 6 parts |
| (a reaction product of 3 mols of tolylene diisocyanate with 1 mol of trimethylolpropane) | |
| Dispersing agent (copper oleate/cyanine dye = 1/1) | 0.1 part |
| Lubricating agent (myristic acid/tridecyl stearate) | 0.1 part |
| Diluting agent | 200 parts |
| (methyl ethyl ketone/cyclohexanone = 1/1) | |
| Diluting agent (toluene/MIBK) | 200 parts |
| Additive (carbon black) | parts shown in Table 2 |

Thereafter, magnetic heads for S-VHS video tape recorders were polished by using each of the prepared abrasive tapes. Each of the polished magnetic head was set in a video tape recorder and the output power was investigated by using a S-VHS tape supplied by Fuji Photo Film Co., Ltd. The results shown in Table 2 were obtained.

Glossiness: Glossiness of each abrasive tapes were measured according to JIS Z8741 at a light incident angle of 45°.

Step wear: Step near the gap was measured by use of AFM.

TABLE 2

|  | carbon black | pH | size (nm) | parts | output (dB) | scratches | glossiness | step wear |
| --- | --- | --- | --- | --- | --- | --- | --- | --- |
| ex. 5-1 | conductex SC | 9.0 | 20 | 5 | 0.0 | 0 | 50% | 20 nm |
| ex. 6 | Asahi XC550 | 7.1 | 35 | 5 | 0.0 | 0 | 48% | 30 nm |
| ex. 5-2 | Asahi #50 | 7.5 | 95 | 5 | 0.0 | 0 | 50% | 25 nm |
| ex. 5-3 | conductex SC alkaline water washed | 11.0 | 20 | 5 | 0.0 | 0 | 50% | 50 nm |
| control 4 | color carbon | 6.0 | 20 | 5 | −0.5 | 3 | 30% | 70 nm |
| control 5 | Vulcan XC72 | 6.0 | 30 | 5 | −0.4 | 2 | 25% | 50 nm |
| control 6 | Leben MTP | 9.0 | 250 | 5 | −1.5 | 8 | 15% | 30 nm |

As can be understood from table 2, a desirable result can be obtained when the carbon black has a pH not smaller than 7 and when the size of the carbon black in the range of 10 to 100 nm.

As can be understood from the description above, by adding carbon black to the abrasive layer in accordance with the present invention, a magnetic head can be polished precisely with less scratches, whereby a magnetic head having a high output power can be produced.

What is claimed is:

1. An abrasive tape comprising a substrate and an abrasive layer on said substrate, said abrasive layer composed of abrasive grains, basic carbon black, and a binder having an acidic functional group.

2. The abrasive tape as defined in claim 1 wherein said carbon black has a pH within the range of 7 to 10 and a mean grain size of 0.01 to 0.1 μm.

3. The abrasive tape as defined in claim 1 or 2 wherein said substrate is provided with a back coating layer.

* * * * *